United States Patent [19]

Kiilunen

[11] Patent Number: 5,593,081
[45] Date of Patent: Jan. 14, 1997

[54] WELDING APPARATUS

[76] Inventor: J. Peter Kiilunen, 31785 Homewood, Farmington Hills, Mich. 48334

[21] Appl. No.: 563,374

[22] Filed: Nov. 28, 1995

[51] Int. Cl.$^6$ .................................................. B23K 37/02
[52] U.S. Cl. ........................ 228/45; 74/480 R; 74/490.15
[58] Field of Search .................... 228/32, 45; 219/125.1, 219/137.7; 74/480 R, 490.12, 490.15

[56] References Cited

U.S. PATENT DOCUMENTS

| 2,818,494 | 12/1957 | Bernard et al. | 219/125.1 |
| 3,046,387 | 7/1962 | Kiilunen | 219/125.1 |
| 3,543,989 | 12/1970 | Cooper | 228/45 |
| 4,221,953 | 9/1980 | Kiilunen | 219/125.1 |
| 4,513,902 | 4/1985 | Tzvetanov et al. | 228/45 |
| 4,532,407 | 7/1985 | Williams et al. | 219/125.1 |
| 5,467,663 | 11/1995 | Trowbridge | 74/490.15 |

OTHER PUBLICATIONS

"Parts List for the Weld Mold 'Arm'", Weld Mold Company, 1970.
Weld Mold Company Ad, Weld Mold Company, circa 25 years ago.
"'Eurekamatic' Water Cooled Gun", Welding Equipment & Supply Company, circa about 1975.

Primary Examiner—Samuel M. Heinrich
Attorney, Agent, or Firm—Gifford, Krass, Groh, Sprinkle, Patmore, Anderson & Citkowski, P.C.

[57] ABSTRACT

A welding device is disclosed having an elongated actuator arm which is secured to a main support post by a cross arm. The cross arm is both slidably and pivotably mounted to the main support post and also pivotably and slidably secured to the actuator arm to enable a wide range of movement for the actuator arm. An elongated linkage bar extends through the actuator arm and a welding gun is attached to one end of the linkage bar. A handle is secured to the linkage bar adjacent the opposite end of the actuator arm so that movement of the handle simultaneously moves the welding gun. A second lever is also secured to the linkage bar at a midpoint along the actuator arm such that movement of the lever also moves the welding gun in the same fashion as the handle.

10 Claims, 2 Drawing Sheets 5,593,081

WELDING APPARATUS

BACKGROUND OF THE INVENTION

1. Field of the Invention

The present invention relates generally to welding apparatus and, more particularly, to a welding arm assembly which provides remote control of the position of the welding gun.

2. Description of the Prior Art

For high temperature welding guns, it is necessary to control the movement of the gun, and thus the welding operation, remotely from the gun itself. In order to achieve this, there have been previously known welding devices to permit the welding control of the welding gun position remotely from the welding gun itself. These previously known devices include U.S. Pat. No. 4,221,953, entitled Welding Electrode Holder and Guide, issued Sept. 9, 1980, U.S. Pat. No. 4,532,409 entitled Welding Apparatus issued Jul. 30, 1985 and U.S. Pat. No. 3,046,387 entitled Welding Device, issued Jul. 24, 1962.

These previously known welding devices, however, have not proven wholly satisfactory in operation for a number of reasons. In some cases, the welding device fails to easily provide complete and accurate control of the position of the welding gun by the operator. Generally, these previously known welding devices have failed to provide movement of the welding gun along a sufficient number of axes in order to allow the operator to accurately and rapidly control the position of the welding gun.

A still further disadvantage of these previously known welding devices is that the control of the welding gun can only be achieved at a single operator position remote from the welding gun. In certain situations, however, it is desirable for the welding operator to control the position of the welding gun from a position closer to the welding gun itself. Such close control of the welding gun position is desirable where highly accurate welding is desired.

SUMMARY OF THE INVENTION

The present invention provides a welding device which overcomes all of the above-mentioned disadvantages of the previously known devices.

In brief, the present invention comprises an elongated actuator arm which is pivotably secured to a main support by a cross arm. Preferably, the cross arm is both pivotably and slidably mounted to both the main support as well as the actuator arm to facilitate movement of the actuator arm along multiple axes of movement.

Additionally, at least a portion of the outer periphery of the actuator arm is cylindrical in cross-sectional shape. The cylindrical portion of the actuator arm is then slidably secured to the cross arm by a tube so that the actuator arm is not only rotatable relative to the tube along its longitudinal axes, but is also axially slidably mounted to the tube within predefined, but adjustable, limits. Such further movement of the actuator arm relative to the cross arm further facilitates the accurate and easy positioning of the actuator arm.

An elongated linkage bar extends through the actuator arm and has one end secured to a welding gun. A handle is secured to the opposite end of the linkage bar so that movement of the handle longitudinally displaces the linkage bar relative to the actuator arm and simultaneously moves the welding gun. The handle is secured to the linkage bar adjacent the end of the actuator arm opposite from the welding gun.

In order to facilitate closer control of the welding gun where feasible, a lever is secured to the linkage bar at a midpoint along the actuator arm. This lever provides a second means for axially displacing the linkage bar relative to the actuator arm, and thus the position of the welding gun, where closer control of the position of the welding gun is desired.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
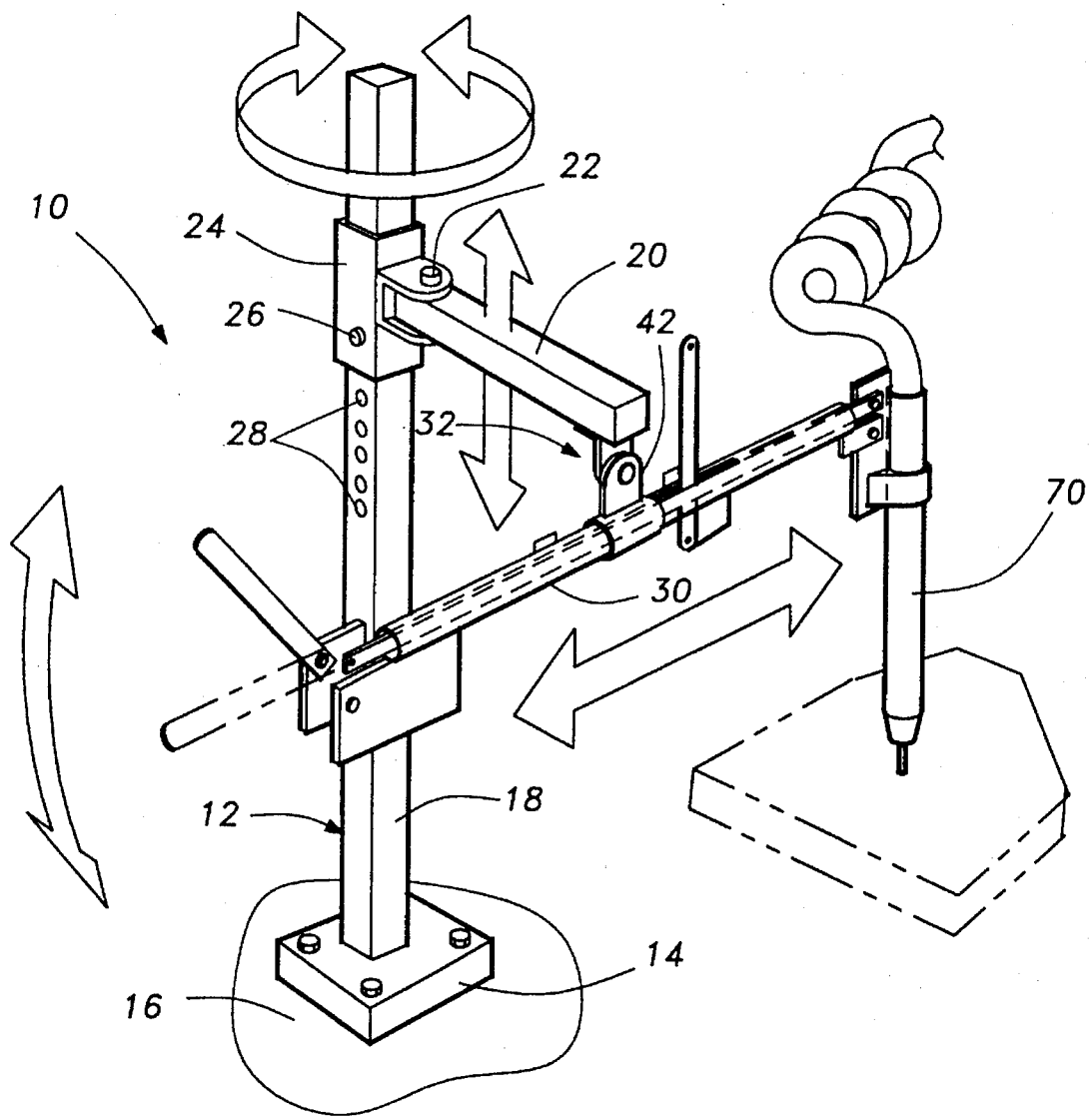
FIG. 1 is an elevational view illustrating a preferred embodiment of the present invention.

With reference first to FIG. 1, a preferred embodiment of the welding device 10 of the present invention is thereshown and comprises a main support 12 having a base 14 secured to a ground support surface 16. A vertically elongated post 18 extends upwardly from the base 14 and may be of any cross-sectional shape.

Still referring to FIG. 1, the welding device 10 further comprises an elongated cross arm 20. One end of the cross member 20 is pivotably secured about a vertical axis by a pivot pin 22 to a channel member 24 having the same cross-sectional shape as the post 18. The channel member 24, in turn, is vertically slidably mounted to the post 18 so that the vertical position of the cross member 22 is controlled by the vertical position of the channel member 24. A locking pin 26 extends through registering openings in the channel member 24 and openings 28 in the post 18 so that the vertical position of the channel member 24 is not only vertically adjustable relative to the post 18 but, once adjusted, locked in position by the pin 26.

Alternatively, a threaded member may be threaded through the channel member 24 which, upon tightening, locks the channel member 24 to the post 18. In this fashion, the vertical position of the channel member 24 can be infinitely adjustable.

Figure 2:
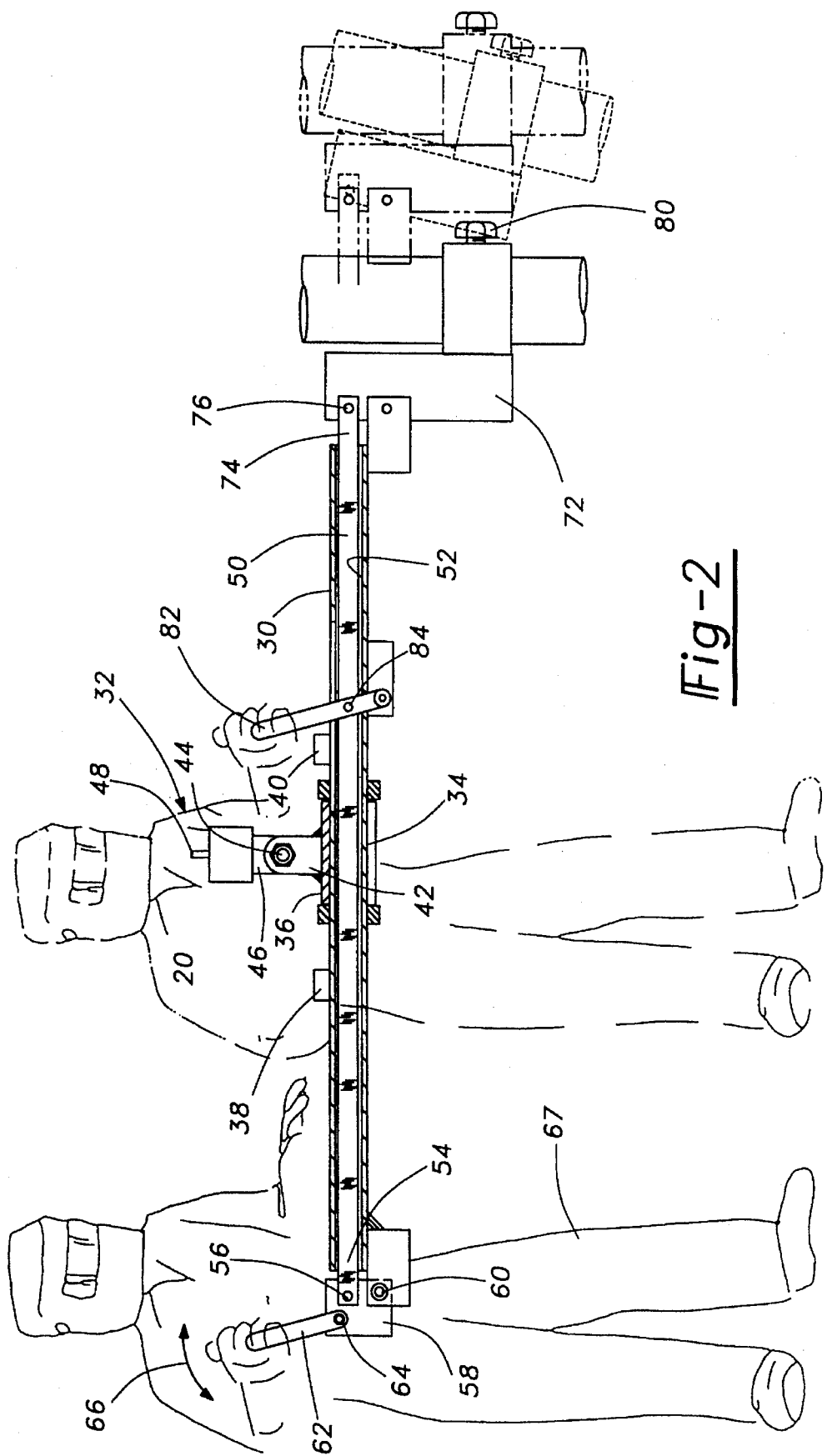
FIG. 2 is a partial sectional side view illustrating the preferred embodiment of the present invention.

Still referring to FIG. 1, an elongated actuator arm 30 is secured to the end of the cross member 20 opposite from the post 18 by a connecting assembly 32. As best shown in FIGS. 1 and 2, at least a portion 34 of the actuating arm 30 is cylindrical in cross-sectional shape. The connecting assembly 32 then includes a tube 36 both slidably and rotatably disposed around the arm portion 34. The tube 36 thus permits the actuator arm 30 to both rotate and axially slide relative to the tube 36. A pair of stop members 38 and 40, however, are secured to the actuator arm 30 on opposite sides of the tube 36. The stop members 38 and 40 thus limit the slidable movement of the actuator arm 30 relative to the tube 36 between predefined limits. The axial position of both stop members 38 and 40, however, can be adjusted along the arm 30 by merely securing the stop members 38 and 40 to the arm 30 by appropriate threaded fasteners at different axial positions along the actuator arm 30. Alternatively, the stop members 38 and 40 could comprise split collars that adjustably clamp around the arm 30.

Referring again to FIGS. 1 and 2, the connecting assembly 32 further comprises a flange member 42 which is secured to the tube 36. This flange member 42 is pivotably secured about a horizontal axis by a pivot pin 44 to a second flange member 46 and this flange member 46, in turn, is pivotably secured about a vertical axis to the end of the cross arm 20 by a pivot pin 48.

As can thus be seen, the multiple pivotal connections provided by the pivot pins 22, 44 and 48, together with both the sliding and rotational attachment of the actuator arm 30 to the cross arm 20 by the tube 36, enables the actuating arm 30 to be accurately controlled along a number of degrees of freedom of movement. These multiple degrees of freedom of movement together with the vertical adjustment of the cross arm 20 by the channel member 24 enable accurate, easy, versatile and complete control of the position of the actuator arm 30.

With reference now especially to FIG. 2, an elongated linkage bar 50 is longitudinally slidably disposed to the interior 52 of the actuator arm 30. One end 54 of the linkage bar 50 is pivotably secured by a pin 56 to a plate 58 which, in turn, is pivotably secured by a pivot pin 60 to the actuator arm 30. A handle 62 is then secured to the plate 58 by a bolt 64 so that pivotal movement of the handle 62, as indicated by arrow 66, longitudinally displaces the linkage bar 50 relative to the actuator arm 30. Furthermore, the angle of attachment of the handle 62 to the plate 58 is adjustable by merely loosening and then retightening the bolt 64 in order to suit the preference of the operator 66.

Still referring to FIG. 2, the opposite end 74 of the linkage bar 50 is secured by a pivot pin 76 to a welding gun bracket 72. The welding gun bracket 72 is also pivotably secured by a pivot pin 78 to the actuator arm 30. Furthermore, the welding gun bracket 72 is adapted to be secured to a welding gun 70 in any conventional fashion, such as by a fastener 80.

The pivotal connection between the linkage bar 50 and both the plate 58 and weld gun bracket 72 thus causes the welding gun 70 to pivot in unison with the pivotal movement of the handle 66 as depicted in phantom line in FIG. 2. Such pivotal movement of the welding gun 70 can take place simultaneously with the axial, rotational or pivotal movement of the actuator arm 30 and cross arm 20. In doing so, the position of the welding gun 70 can be both accurately and remotely controlled.

In some situations, however, closer control of the position of the welding gun 70 than can be provided by the handle 62 is desired. In order to accomplish this, the welding device 10 of the present invention includes a lever 82 which is pivotably secured by a pivot pin 84 to a midpoint of the linkage bar 50. The lever 82 is also pivotably secured by a pivot pin 86 to the actuator arm 30. Consequently, the lever 82 moves in unison with the handle 62. However, since the lever 82 is closer to the welding gun 70 than the handle 62, the position of the welding gun 70 can be controlled with greater precision using the lever 82 than the handle 62 where feasible.

It can therefore be seen that the welding device of the present invention provides a device for remotely controlling the position of a welding gun with not only great precision, but also versatility provided by multiple axis of movement of the welding device. Furthermore, the dual position control of the welding gun provided by both the handle 62 and the lever 82 enables control of the position of the welding gun 70 with different degrees of precision as required by the welding operation.

Having described my invention, however, many modifications thereto will become apparent to those skilled in the art to which it pertains without deviation from the spirit of the invention as defined by the scope of the appended claims.

I claim:

1. A welding apparatus comprising:

an elongated actuating arm, a welding gun, a main support having one end supported on a ground support surface, means for attaching said actuating arm to said main support, an elongated linkage bar extending through said actuating arm and having one end secured to said welding gun wherein axial movement of said linkage bar relative to said actuating arm moves said welding gun, a handle secured to said linkage bar adjacent a second end of said actuating arm for axially moving said linkage bar, and a lever secured to a midpoint of said linkage bar for axially moving said welding gun.

2. The invention as defined in claim 1 wherein said main support comprises an elongated and vertically extending post and wherein said attaching means comprises an elongated cross arm, means for slidably securing one end of said cross arm to said post and means for securing the other end of the cross arm to said actuating arm.

3. The invention as defined in claim 2 wherein at least a portion of said actuating arm has an outer cylindrical periphery and wherein said means for securing the other end of said cross arm to said actuating arm comprises a tube axially slidably mounted to said portion of said actuating arm and means for pivotally securing said tube to said cross arm about a generally horizontal axis.

4. The invention as defined in claim 3 wherein said means for securing the other end of said cross arm to said actuating arm further comprises means for pivotally mounting said tube to said cross arm about a generally vertical axis.

5. The invention as defined in claim 4 and comprising means for pivotally mounting said one end of said cross arm to said post about a generally vertical axis.

6. The invention as defined in claim 4 and comprising means for vertically slidably mounting said one end of said cross arm to said post.

7. The invention as defined in claim 6 and comprising means for locking said cross arm to said post at an adjusted height.

8. The invention as defined in claim 3 wherein said actuating arm is axially slidably mounted to said tube within predefined limits.

9. The invention as defined in claim 7 and comprising means for adjustably setting said predefined limits.

10. The invention as defined in claim 1 and comprising means for adjustably securing said handle to said linkage bar.

\* \* \* \* \*